(12) United States Patent
Mueller et al.

(10) Patent No.: US 8,066,292 B2
(45) Date of Patent: Nov. 29, 2011

(54) STEERING DEVICE FOR A MOTOR VEHICLE

(75) Inventors: Hugo Mueller, Rohrenfells-Ballersdorf (DE); Christoph Kossira, Ingolstadt (DE); Karl-Heinz Meitinger, Trostberg (DE); Michel Wilfried, Riedenburg (DE); Wolfgang Schmid, Freising (DE)

(73) Assignee: Audi AG, Ingolstadt (DE)

( * ) Notice: Subject to any disclaimer, the term of this patent is extended or adjusted under 35 U.S.C. 154(b) by 14 days.

(21) Appl. No.: 12/565,251

(22) Filed: Sep. 23, 2009

(65) Prior Publication Data
US 2010/0078910 A1 Apr. 1, 2010

(30) Foreign Application Priority Data
Sep. 23, 2008 (DE) .......................... 10 2008 048 568

(51) Int. Cl.
*B62D 5/30* (2006.01)
(52) U.S. Cl. .................................. 280/93.503
(58) Field of Classification Search .............. 280/5.521, 280/5.52, 86.751, 86.757, 124.134, 124.135, 280/124.128, 124.15, 93.503, 93.504
See application file for complete search history.

(56) References Cited

U.S. PATENT DOCUMENTS

| 7,712,748 B2 * | 5/2010 | Deal et al. ................... 280/5.521 |
| 2010/0078910 A1 * | 4/2010 | Mueller et al. ........... 280/93.503 |
| 2010/0327543 A1 * | 12/2010 | Meitinger et al. ......... 280/5.521 |

FOREIGN PATENT DOCUMENTS

| DE | 102004049296 A1 | 4/2006 |
| DE | 102008011367 A1 | 4/2009 |
| JP | 60015224 A | 1/1985 |
| WO | WO 9006255 A1 | 6/1990 |
| WO | WO 9209476 A | 6/1992 |
| WO | WO 9816418 A | 4/1998 |

\* cited by examiner

*Primary Examiner* — Faye M. Fleming
(74) *Attorney, Agent, or Firm* — Novak Druce & Quigg LLP

(57) ABSTRACT

The invention relates to a steering device for a vehicle, with at least one actuator which pivots at least one steerable vehicle wheel by a steering angle which can be stipulated by way of a steering angle transducer. According to the invention, the actuator has a wheel-side pivoted part and an axle-side pivoted part which can be turned around their axes of rotation to one another and that to set the steering angle of the vehicle wheel, the wheel-side pivoted part can be deflected in the turning of the two pivoted parts by the swivel angle ($\phi$) relative to the axle-side pivoted part.

31 Claims, 5 Drawing Sheets

STEERING DEVICE FOR A MOTOR VEHICLE

The invention relates to a steering device for a motor vehicle.

BACKGROUND OF THE INVENTION

Conventional steering systems, in particular steering systems on multitrack vehicles, can only be used in conjunction with a vehicle axle whose axle kinematics is steerable. Thus rotary motion of the steering wheel by way of the steering column is delivered into the steering gear and relayed as linear motion to the swivel bearing.

A generic steering device for a motor vehicle has at least one actuator which pivots at least one steerable vehicle wheel and a steering angle. The steering angle is dictated by the rotary motion of the steering wheel.

Generally, this combination is designed with a fixed transmission ratio for left-right deflection of the wheels. Analogously, the camber curve and/or track curve is determined by the mechanically dictated axle kinematics of the respective wheel suspension and thus cannot be actively set.

The aforementioned swivel bearing of conventional pivoting systems is associated with a complex axle construction due to the rotary bearing points to the chassis. The axle kinematics is moreover not variable, but mechanically fixed. Moreover, the steering gear of conventional steering systems is positioned in a fixed manner to the axles due to the steering geometry and thus determines the front end concept. This often leads to complex component designs, such as, for example, a split transmission. In addition, the steering column of conventional steering systems in a vehicle crash is often a major safety risk to the occupants.

The object of the invention is to make available a mechanically simple steering device with reduced installation space.

SUMMARY OF THE INVENTION

According to the characterizing part of claim 1, the actuator of the steering device has a wheel-side pivoted part and an axle-side pivoted part which can be turned around their axes of rotation to one another. In doing so, to set the steering angle of the vehicle wheel the wheel-side pivoted part can be deflected by turning the two pivoted parts to one another by the swivel angle relative to the axle-side pivoted part.

According to the invention, the steering function takes place solely by turning the two interacting pivoted parts of the actuator. The steering function can preferably take place at the same time with superimposed camber and/or track optimization. For this purpose the vehicle wheel assigned to the wheel-side pivoted part is pivoted by the track angle and/or camber angle, as will be detailed below. As a result of eliminating the steering column, according to the invention, a configuration of the driver's seat with additional degrees of freedom is possible. Likewise, greater freedom in the package design results.

In contrast to the prior art, the angle of the wheel-side pivoted part therefore is set by rotary actuation of one of the pivoted parts or the two pivoted parts of the actuator, and not by the linear lifting motion of a hydraulic actuating cylinder which presses against the wheel-side bearing element. The angle can be set by rotary actuation of the two pivoted parts in the same or opposite direction and also by turning one of the two pivoted parts, while the other pivoted part does not rotate around its axis.

According to the invention, the wheel-side pivoted part with its middle axle can be moved around its axis of rotation in a type of wobble motion. For this purpose the axis of rotation of the wheel-side pivoted part can be tilted by an angle relative to the axis of rotation of the axle-side pivoted part. In the wobble motion of the wheel side pivoted part, the two pivoted parts can be in contact by way of control surfaces, preferably sliding contact and/or rolling contact (antifriction bearings), which in turn lie in one plane of rotation. The plane of rotation is aligned perpendicularly to the axis of rotation of the wheel-side pivoted part. In this way the wheel-side pivoted part can move with the pertinent wheel-side vehicle wheel in a wobble motion around its axis of rotation. Here the swivel angle changes between the wheel-side pivoted part and the axle-side pivoted part as a function of the angle of rotation of the wheel-side pivoted part.

In terms of installation space engineering it is favorable if the actuator according to the invention is integrated in the wheel carrier of the wheel suspension of the vehicle. The wheel carrier can have a wheel side support member which pivots the vehicle wheel, and an axle-side support member, between which the actuator according to the invention is connected.

The two pivoted parts of the actuator can preferably be pivoted by way of pivot bearings on the respective support members. In this way turning of the two pivoted parts to one another can take place without torque being transferred to the support members.

It is preferable in terms of installation space engineering if the two pivoted parts are designed as hollow cylinders. The cylindrical interior of the hollow cylinders can therefore be used as installation space for an actuating drive, articulated shafts or synchronous shafts. Depending on the available installation space the actuating drive can also be located outside the pivoted parts and can be propulsively connected to the pivoted parts. Alternatively to the hollow-cylindrical execution, the pivoted parts can also be made from solid material and/or in any form.

By turning the wheel-side pivoted part relative to the axle-side pivoted part, the swivel angle between the two pivoted parts can thus be set. The maximum adjustable pivot angle, for reasons of geometry, is twice the tilt angle enclosed between the two axes of rotation.

The three-dimensional alignment of the angle arrangement formed by the two pivoted parts can be changed by rotation of the axle-side pivoted part which takes place simultaneously or offset in time relative to the axle-side support member.

The actuating drive for the two pivoted parts can be, in particular, a torque motor which can be arranged in a space-saving manner in a compact design within the hollow cylindrical pivoted parts. Alternatively, the actuating drive, as already mentioned, can also be located outside or in combination both on the outside and also inside.

The actuating drives for the two pivoted parts can be incorporated in a controlled system or control circuit with the control means. The control means can actuate the actuator, in particular its actuating drive, on the basis of the steering angle which is dictated by way of the steering wheel. In addition, the control means, on the basis of the specified track angle or specified camber angle, which is to be set, can establish the angle of rotation of the two pivoted parts. For a closed control circuit the two pivoted parts can be assigned an angle transducer which detects the actual value of the angle of rotation of the two pivoted parts and feeds it back to the control means. The invention can be used in all control strategies with reference to driving dynamics, driving comfort, safety settings or the basic design of the vehicle.

The actuating drives are triggered by way of the steering wheel as is known from steer-by-wire systems. For this purpose the steering motion of the vehicle occupant is detected by means of a manual torque controller by way of suitable sensors, processed by a control device and routed to the motors by way of the aforementioned control means. Steering can be set with numerous parameters which are the input quantities for the control means, for example variable steering characteristic, functionally-adapted track/camber characteristic, axle reset moments independent of kinematics, and the like. The steering kinematics according to the invention is not linked to a rigid steering trapezoid.

For a design of the wheel suspension which is compact in the transverse direction of the vehicle, the two pivoted parts can be arranged internested into one another. Preferably, one of the two pivoted parts, for example the wheel-side pivoted part, can be designed as a cup-shaped, hollow profile part, in which there is an axle-side pivoted part. The bottom of the cup-shaped pivoted part in this case can be designed as the above described control surface which is in contact with the control surface of the axle-side pivoted part.

In addition, at least one of the support members can be made as a cup-shaped hollow profile part with a peripheral wall which borders the mounting space in which the actuator according to the invention is located. For stable rotary support, the pivoted parts can be supported on the peripheral wall of the cup-shaped support member. In the above described internested arrangement of pivoted parts, only the radially outer pivoted part can be supported on the peripheral wall of the cup-shaped support member.

According to another embodiment, between the wheel-side support member and the axle-side support member an additional coupling element is connected, by way of which torque can be transmitted, for example a braking moment, from the wheel-side wheel element to the axle-side support member and thus to the vehicle body. This configuration of the invention is based on the problem that both the wheel-side pivoted part and also the axle-side pivoted part can be turned relative to one another with respect to the support member. In an unfavorable case therefore, for example, a braking moment, as a result of the degree of rotational freedom between the pivoted parts, cannot be exactly transferred to the axle-side support member or the vehicle body, proceeding from the wheel-side support member. With the additional coupling element a further path of forces and moments is made available, via which the braking moment can be reliably transmitted to the vehicle body.

The coupling element is preferably completely decoupled from the actuator connected between the support members or the pivoted parts of the wheel carrier. In this way neither the coupling element nor the actuator is functionally influenced by the respectively other component.

The coupling element can preferably be torsionally stiff in order to ensure transmission of torque. Moreover, the coupling element can be made relatively elastic and/or resilient in order to be able to equalize the deflection of the wheel-side pivoted part relative to the axle-side pivoted part.

In one preferred embodiment the coupling element is made as a metal bellows which is mounted both on the wheel-side and also on the axle-side support member, for example, by way of fastening screws. In the mounting space bordered by the metal bellows, the pivoted parts of the actuator can be mounted so as to be protected against dirt. The pivoted parts can be spaced apart from the metal bellows over a free radial distance.

As indicated in the foregoing, the two pivoted parts can be designed as hollow cylinders. Their cylindrical interior can be used as the installation space for the actuating drives. Alternatively, an articulated shaft for driving a vehicle wheel can be routed through the interior of the pivoted parts.

The arrangement of the actuating drives within the hollow cylindrical pivoted parts is especially preferred when the vehicle wheel is trailed, that is, is not driven by an articulated shaft. In this case, the cavity of the pivoted parts is empty. Therefore, the actuating drives can be easily located in it.

When using an articulated shaft guided through the cavity of the pivoted parts, it can be necessary, due to the limited installation space, to locate the actuating drives outside the two hollow cylindrical pivoted parts. In this case, on each of the pivoted parts on the outer peripheral side there can be one gearing stage at a time, for example a spur pinion stage or the like. The actuating drives which are propulsively connected to it can be integrated into open spaces intended for this purpose outside the wheel carrier in a manner favorable to installation space.

Such an arrangement of the gearing stages and of the pertinent actuating drives outside the pivoted parts presents, however, a problem with respect to use of a metal bellows as a coupling element. The respective gearing stage or the pertinent actuating drive would have to be routed through the metal bellows, as a result of which the serviceability of the metal bellows is reduced. If specifically this routing through of the gearing is integrated into the metal bellows, the torque which can be transmitted by the metal bellows drops due to the planar moment of inertia at this point. The diameter of the metal bellows would have to be greatly increased for equalization.

Alternatively, to the metal bellows, a universal joint which is connected between the wheel-side and axle-side support member can therefore be used as a coupling element. For an embodiment with reduced installation space, the universal joint can have an articulated part, for example a ring element, which is located preferably radially outside the pivoted parts and which extends with a radial distance around the pivoted parts. Moreover, the universal joint can have bridges which are connected to the support members and which in the manner of an articulated fork in turn are articulated to the ring element by way of axes of rotation. In this way, torsionally-stiff and play-free torque transmission between the two support members of the wheel carrier takes place by means of the universal joint.

In contrast to the metal bellows, the universal joint can equalize the deflection of the wheel-side pivoted part by a defined swivel angle relative to the axle-side pivoted part entirely without elastic reset forces and thus more smoothly overall than the metal bellows.

The aforementioned wheel-side and axle-side bridges are preferably located angularly offset to one another with the formation of open spaces. At least in part an actuating drive can be located in these open spaces in a manner favorable to installation space or, alternatively, there can be a gearing stage located on the outside on the pivoted part.

The middle of the universal joint according to one embodiment of the invention lies at the height of the instantaneous pole of the wheel carrier, as a result of which a change in length does not occur when the wheel carrier is adjusted.

Both the bellows and also the universal joint can accommodate the braking moments which occur. In this way the actuating mechanisms which are made available by means of the pivoted parts cannot be stressed by the braking moments.

By choosing a suitable gearing stage or spur pinion stage the actuating drives can also be set at an angle to the middle axis of the actuator. For the case in which the axle distances between the actuating drive and the pivoted part are too large so that the spur pinion toothing should also become too large, for example, a toothed belt drive can also be used.

DETAILED DESCRIPTION OF THE PREFERRED EMBODIMENTS OF THE INVENTION

Figure 1:
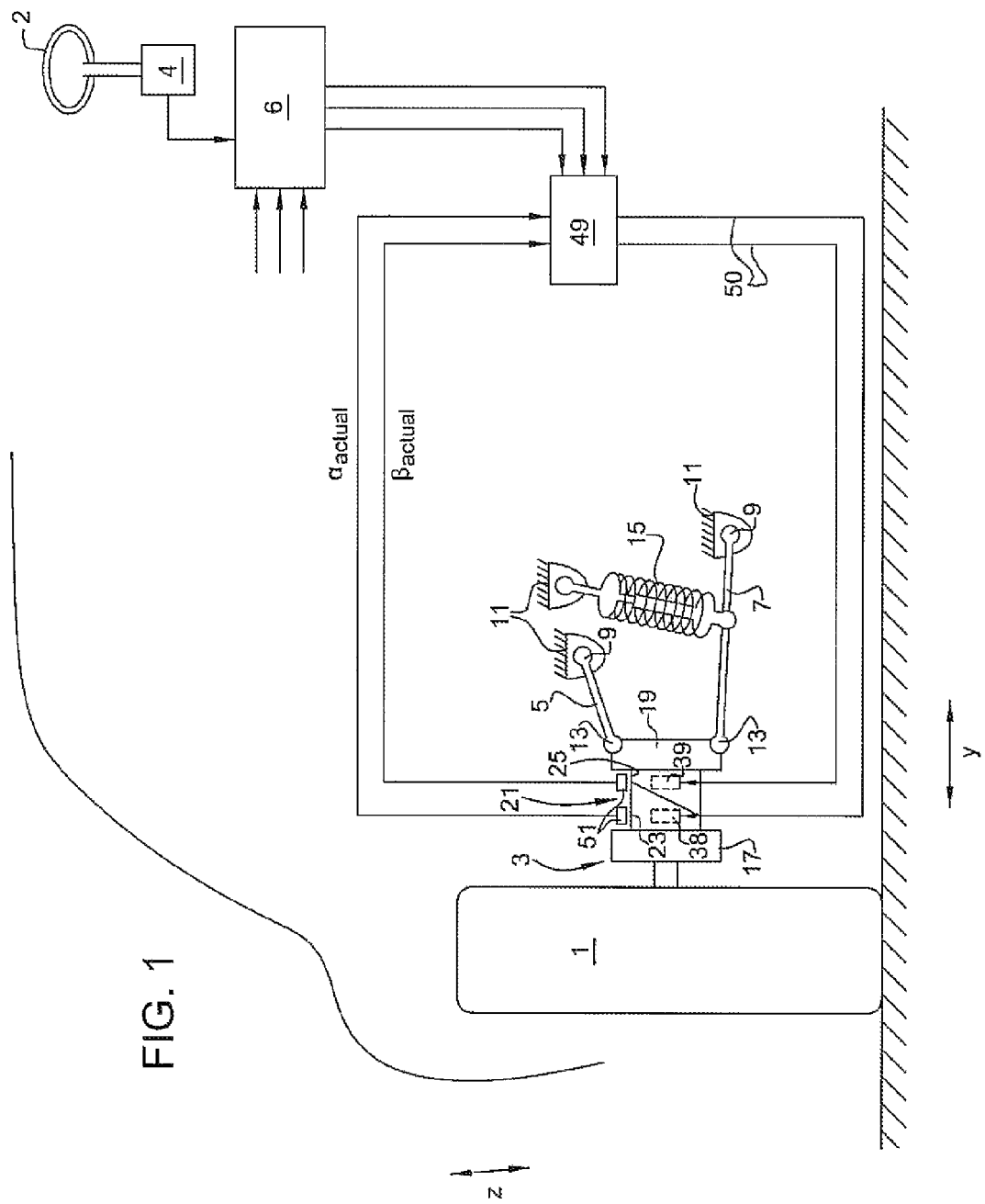
FIG. 1 shows in a schematic a steering device for a vehicle according to the first embodiment.

FIG. 1 shows a steering device for a motor vehicle. The steering device has a steering wheel 2 which can be controlled by the vehicle occupants, with an assigned manual torque controller 4. The manual torque controller detects the steering motion of the vehicle occupants by way of suitable sensors. Its motion signal is processed by a control device 6, as is known from steer-by-wire systems.

The control device 6, based on the detected steering motion, generates a control signal which is routed to a control means 49 of the steering device, which means will be described below. The control means 49 can trigger an actuator 21 which is assigned to the steering device and which pivots the steerable vehicle wheel 1 which is shown in FIG. 1 by the steering angle whose size is determined by the rotary motion of the steering wheel 2.

As is furthermore apparent from FIG. 1, the actuator 21 is integrated in the wheel suspension of the motor vehicle.

FIG. 1 furthermore shows the wheel suspension in conjunction with a known suspension arm axle in which a wheel carrier 3 which bears the vehicle wheel 1 also using an upper suspension arm 5 and a lower suspension arm 7 is pivotally coupled to the vehicle body 11 by way of body-side steering bearings 9. The body-side steering bearings 9 and the wheel carrier-side steering bearings 13 are of conventional design. Between the lower suspension arm 7 and the vehicle body 11 a support spring 15 with an assigned McPherson strut unit is moreover supported in the conventional manner.

In contrast to the illustrated suspension arm axle, the wheel carrier 3 can be combined with any axle, for example a rigid axle, a compound steering axle, a multiple steering axle, etc.

As shown in FIG. 1, the wheel carrier 3 has a wheel-side support member 17 and an axle-side support member 19. On the wheel-side support member 17 the vehicle wheel 1 is supported by way of a wheel hub in a wheel bearing of the wheel-side support member 17, which bearing is not shown. Moreover, the brake system can be conventionally mounted on the wheel-side support member 17. The two suspension arms 5, 7 are coupled to the axle-side support member 19 by way of steering bearings 13.

Between the two support members 17, 19 there is the already mentioned actuator 21 of the steering device which has a wheel-side pivoted part 23 and an axle-side pivoted part 25. As follows from FIG. 2 or 3, the two pivoted parts 23 and 25 are in contact with one another by way of tilted control surfaces 24, 26. The two control surfaces 24, 26 thus lie in the plane of rotation I which is shown in FIG. 3 and in which they can be moved in sliding contact on one another. Instead of the illustrated sliding contact, rolling support between the pivoted parts is likewise possible.

The pivoted parts 23, 25 are pivoted between the two support members 17, 19 respectively around their axes of rotation 27, 28. The axis 28 of rotation of the pivoted part 25 is axially aligned in the transverse direction of the vehicle y and coaxially to the middle axis 29 of the pivoted part 23. The axis of rotation 27 of the pivoted part 23 is tilted up by an angle of incline γ. For rotation by an angle of rotation α therefore the pivoted part 23 moves with its middle axis 29 in wobble motion II with a variable swivel angle φ around the axis of rotation 27. Alternatively, a skewed alignment of the two axes of rotation 27, 28 is also possible.

FIG. 3 shows the pivoted part 23 in its initial position at an angle of rotation α=0 in which the middle axle 29 of the pivoted part 23 is aligned coaxially to the axis of rotation 28 of the pivoted part 25. In this case, the camber angle ε is 0 in the illustrated yz plane of the vehicle wheel 1.

Moreover, FIG. 3 shows in broken lines the pivoted part 23 by way of example in the rotary position at an angle of rotation α=180°. In this rotary position the pivoted part 23 with its middle axle 29' is moved up in wobble motion II around the axis of rotation 27. This yields a swivel angle φ between the two pivoted parts 23 and 25. The swivel angle φ has its maximum value at the illustrated rotary angle α of 180°. Accordingly, the vehicle wheel 1 or the wheel-side support member 17 is also swiveled by the camber angle ε in the yz plane.

Simultaneously with the rotation of the pivoted part 23 or offset in time thereto, the pivoted part 25 can also be turned by an angle of rotation β relative to the axle-side support member 19.

In this way the pivoted part 23 which is shown in FIG. 3 and which is bent relative to the axle-side pivoted part 25 is swiveled out of the yz plane, as a result of which the track angle δ of the vehicle wheel 1 can be set. In exemplary rotation of the bent pivoted part 23 by an angle of rotation β of 90° in the xy plane, the track angle δ would thus correspond to the swivel angle φ, and the camber angle ε would be reduced to 0.

Thus combined camber and track setting can be effected by combined turning of the pivoted parts 23, 25 by the angles of rotation α, β. Here any combination of the track angle δ and camber angle ε can be represented as long as a maximum swivel angle $\phi_{max}=2\gamma$ is not exceeded, and the following equation $$\sin^2\delta+\sin^2\epsilon=\sin^2\phi_{max}$$

is observed.

The tilt angle γ enclosed between the two axes of rotation 27 and 28 is shown exaggerated in the figures for better understanding. In fact, the tilt angle fluctuates on the order of 2° to 5°. Depending on the respective application, the tilt angle can also be outside this angle range. Tilt angles on the order of 45° are also conceivable, depending on the application.

In any combinations of the track angle δ and camber angle ε the center point M shown in FIG. 3 on the free end side of the wheel-side pivoted part 23 moves in a spherical surface extract.

Figure 2:
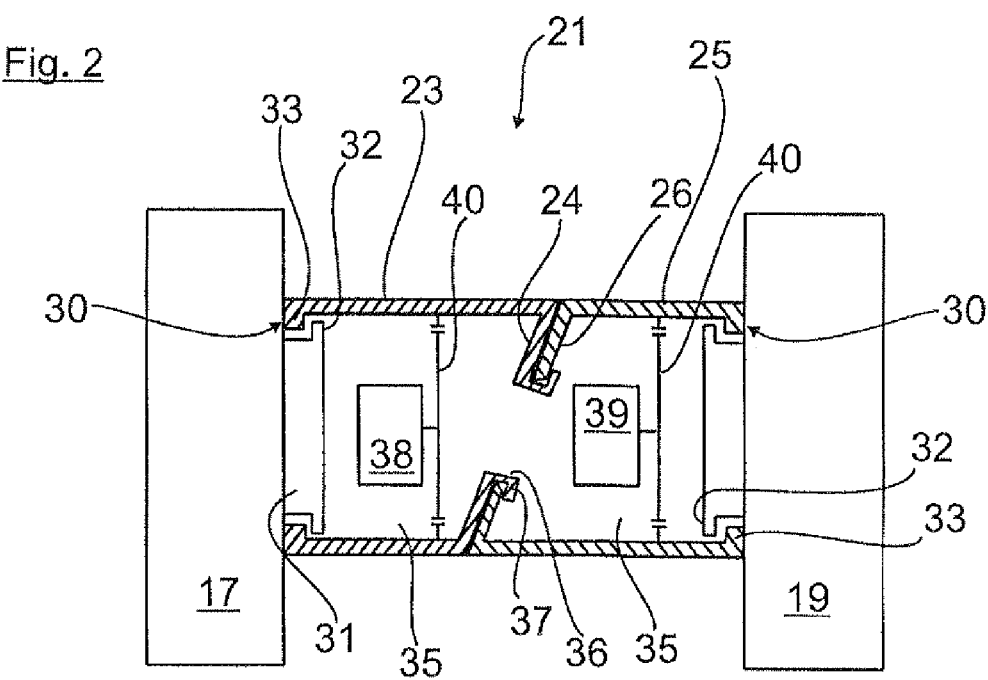
FIG. 2 shows in an enlarged schematic partial sectional view the wheel carrier in isolation, in which an actuator of the steering device is integrated.
Figure 3:
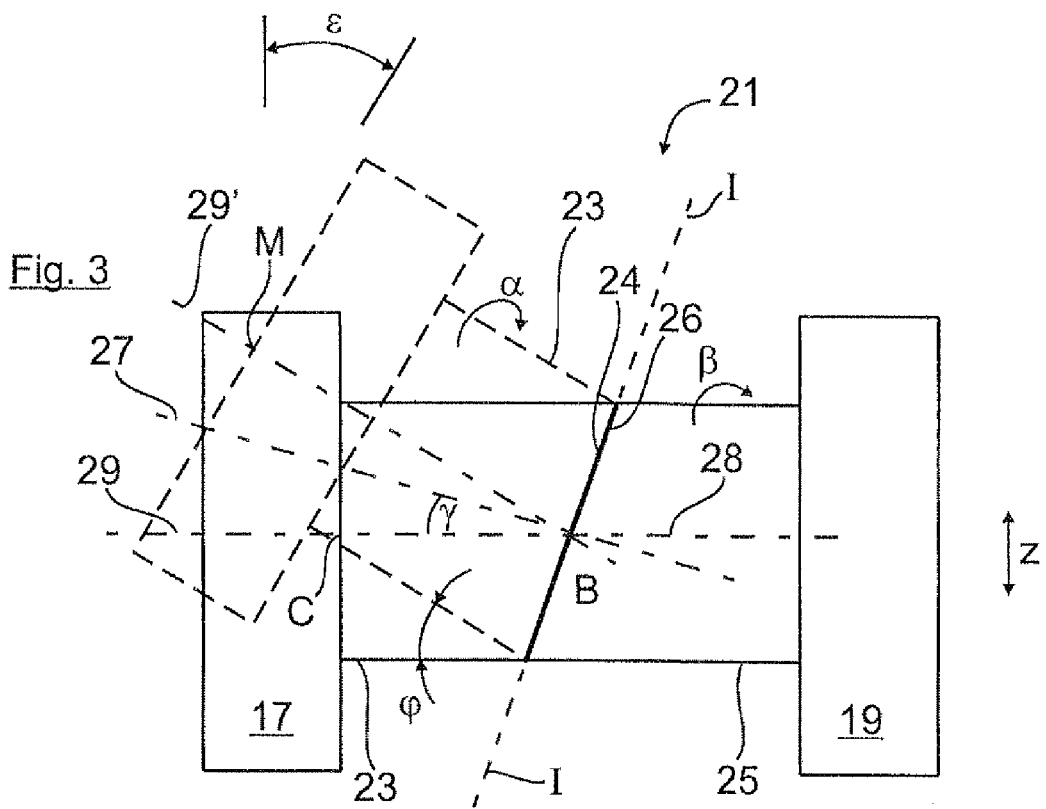
FIG. 3 shows a view of the wheel carrier in which swiveling motions of the two pivoted parts for setting a steering angle dictated by the steering wheel or the track angle or camber angle.

FIG. 2 shows roughly schematically and only by way of example the bearing arrangement and the actuating drive of the two pivoted parts 23, 25 between the support members 17, 19 of the wheel carrier 3. Thus the pivoted parts 23, 25 are connected to the support members 17, 19 by way of pivot bearings 30. The pivot bearings 30 each have an axle projection 31 which projects from the support member 17 and which projects into the pivoted part 23, 25 which is shaped to be hollow-cylindrical. Each axial projection 31 extends behind an end-side ring collar 33 of the respective pivoted part 23, 25 with a flange 32 which is widened in the radial direction. The two pivoted parts 23, 25 are pivoted with their ring collar 33 between the flange 32 and the respective support member 17, 19. On the control surfaces 25, 26 which are in contact with one another there are mounting openings opposite one another. They connect the two cylindrical interiors 35 of the pivoted parts 23, 25.

As indicated in the foregoing, the two control surfaces 24, 26 are in sliding contact to one another and can be moved onto one another when the two pivoted parts are turned. For coupling of the two pivoted parts 23, 25 as shown in FIG. 2 the control surface 24 of the wheel-side pivoted part 23 is designed with a peripheral flange 36 which is hook-shaped in cross section. The flange 36 projects through the mounting opening of the opposing control surface 26 of the axle-side pivoted part 25 and with one leg 37 the control surface 26 extends behind the pivoted part 25.

In the cavities 35 of the two pivoted parts 23, 25 there are torque motors 38, 39 which mesh with the internal toothing of the respective pivoted part 23, 25 by way of a gear train 40.

For setting of the steering angle of the vehicle wheel 1 or for active track and camber adjustment, as shown in FIG. 1 the setpoints are computed for the steering angle and/or the track and camber angles by a higher-order control device 6 based on different vehicle parameters and/or steering parameters and are routed to a control means 49. The control means 49 can be triggered by way of signal lines 50 with the torque motors 38, 39 of the two pivoted parts 23, 25 which turn the respective pivoted parts 23, 25 over an angle of rotation $\alpha$ or an angle of rotation $\beta$. As indicated in FIG. 1, phase-angle sensors 51 are assigned to the two pivoted parts 23, 25, detect one actual value $\alpha_{actual}$ and $\beta_{actual}$ of the two pivoted parts 23, 25 at a time and feed them back to the control means 49.

The angles of rotation $\alpha$ and $\beta$ for the torque motors 38, 39 of the two pivoted parts 23, 25 are computed by means of a motion algorithm in the control means 49.

In contrast to the illustrated torque motors 38, 39, the pivoted parts 23 and 25 can be turned by any actuating mechanism which produces a rotary motion. Here the initial position of the two cylinders to one another can be arbitrarily selected and is only dependent on the current track and camber value stipulation.

Figure 4:
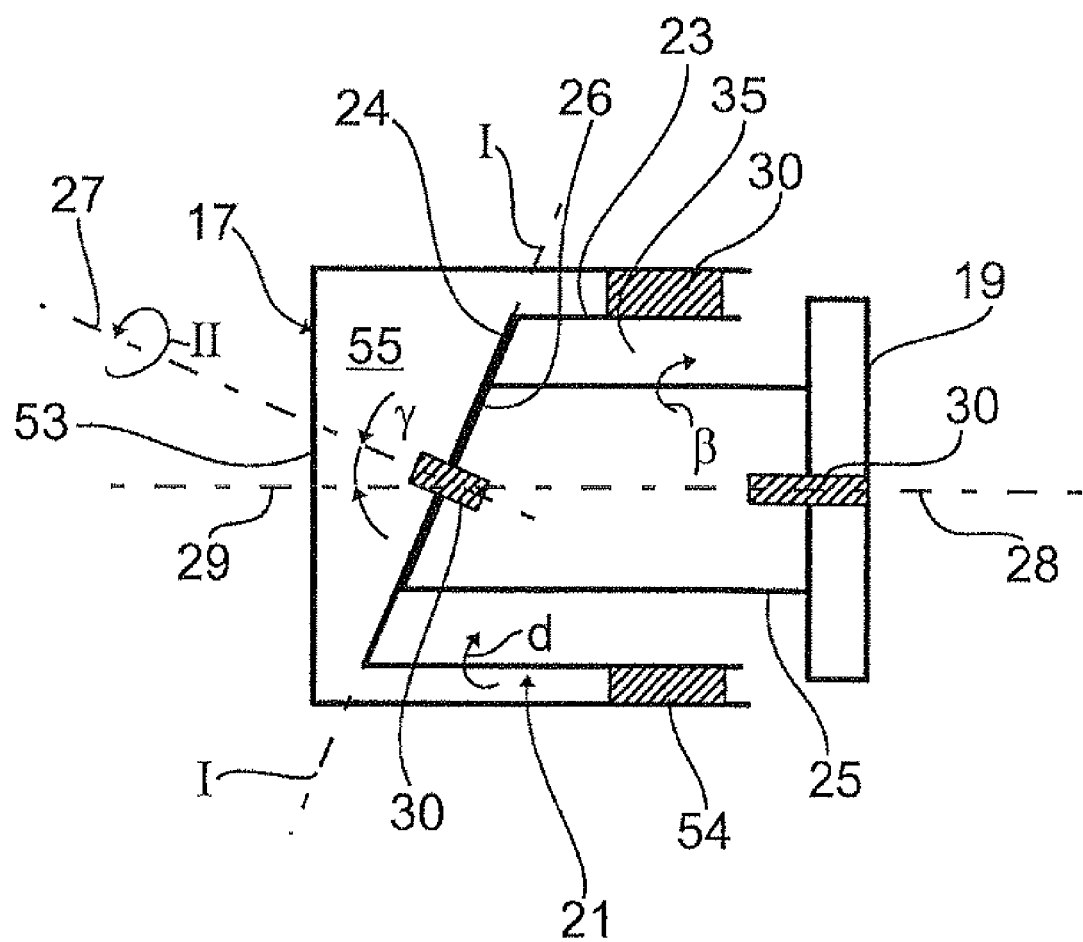
FIG. 4 shows the wheel carrier according to the second embodiment in isolation.

FIG. 4 schematically shows the wheel carrier 3 according to the second embodiment. The method of operation corresponds to that of the wheel carrier 3 of FIGS. 1 to 3 so that reference is made to its description. For components which correspond to one another, identical reference numbers are used.

In contrast to the first embodiment, the two pivoted parts 23, 25 are not arranged axially in succession, but the two pivoted parts 23, 25 are arranged internested into one another in a manner favorable to installation space. The axle-side pivoted part 25 is located here in the cylindrical cavity 35 of the wheel-side pivoted part 23.

As in the first embodiment, in FIG. 4 the two pivoted parts 23, 25 are in contact with one another by way of their inclined control surfaces 24, 26 which lie in turn in the plane of rotation I. The wheel-side support member 17 here is made not as a plate, but cup-shaped with a wheel-side support member bottom 53 and a peripheral wall 54 which is cylindrical here, for example.

The actuator 21 which consists of the two pivoted parts 23, 25 is located almost completely within the mounting space 55 which is bordered by the cup-shaped support member 17. The pivoted part 23 is pivotally supported by way of the pivot bearing 30 on the peripheral wall 54 of the support member 17. Only the axle-side end of the pivoted part 25 which is pivoted on the axle-side support member 19 projects out of the mounting space 55 of the cup-shaped support member 17.

Analogously to the first embodiment the pivoted part 23 with it middle axis 29 can turn around the axis of rotation 27 in wobble motion II with a variable swivel angle $\phi$. Moreover, the pivoted part 25 can turn by the angle of rotation $\beta$ relative to the axle-side support member 19.

The first two embodiments of FIGS. 1 to 4 address the fundamental method of operation and the control algorithm on whose basis the wheel-side and axle-side pivoted parts 23, 25 can be turned to one another between the wheel-side support member 17 and the axle-side support member 19.

As furthermore follows from FIGS. 1 to 4 of the first two embodiments, the two support members 17 and 19 are not mounted torsionally strong relative to one another, but in certain operating and driving states the degree of rotational freedom described again below between the two support members 17, 19 is of importance: Thus, as shown in FIG. 2, on the one hand, the torque motor 38 can turn by way of the gear train 40 the pivoted part 23 both relative to the pivoted part 25 and also relative to the wheel-side support member 19. On the other hand, the torque motor 39 can turn the pivoted part 25 by way of the gear train 40 relative to the pivoted part 23 and also relative to the axle-side support member 19. The torque motor 38 can be permanently connected to the wheel-side support member 17, while the torque motor 39 can be permanently connected to the axle-side support member 19. Even with the torque motors 38, 39 blocked, the two pivoted parts 23, 25 are not connected to one another torsionally strong by way of their control surfaces 24, 26.

In an unfavorable case, in the arrangement shown in FIGS. 1 to 4 there is thus the risk that moments from the wheel-side support member 17 are not transmitted to the axle-side support member 19 because torque transmission is not possible even with the torque motors 38, 39 blocked by way of the control surfaces 24, 26 of the pivoted parts 23, 25 by the degree of rotational freedom which is present in between. Such torques which are to be transmitted are, for example, braking moments or reaction moments from the wheel tread with a lever arm which results to a certain extent from the inclined action surfaces.

In the following third and fourth embodiments of FIGS. 5 and 6, therefore for torque transmission from the wheel-side support member 17 to the axle-side support member 19 coupling elements 57 are connected in between and are made flexurally soft and torsionally stiff in their axial direction.

Figure 5:
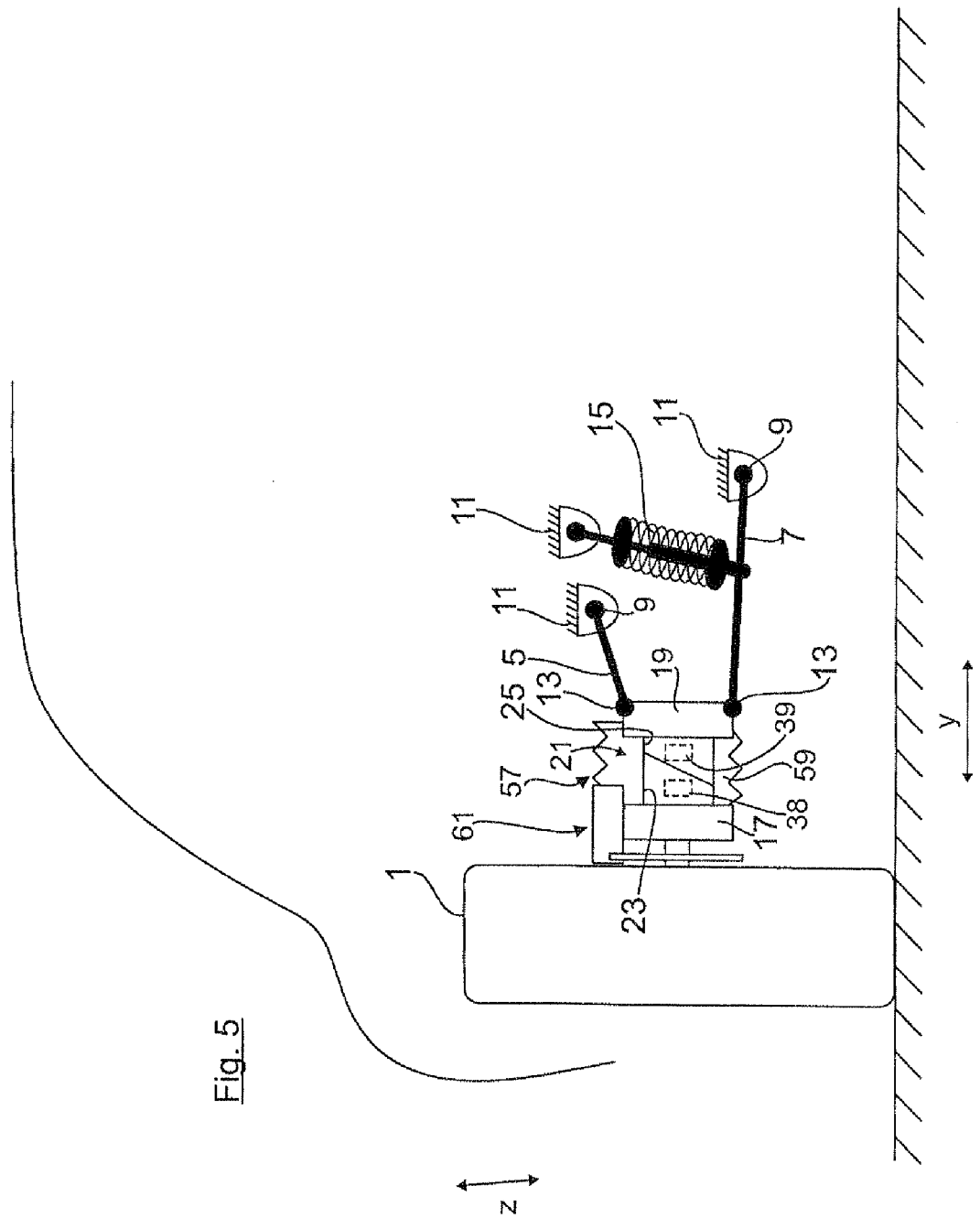
FIG. 5 shows the wheel carrier according to the third embodiment with an integrated metal bellows.

The third embodiment shown in FIG. 5 is essentially identical to the first embodiment in terms of operation and construction. Accordingly, reference is made to its description. In contrast to the preceding embodiments, in the embodiment of FIG. 5, the coupling element 57 is a metal bellows. Metal bellows conventionally have high torsional stiffness, so that exact transmission of the angular moments or torques is ensured regardless of the transmission path which leads by way of the pivoted parts 23, 25.

The metal bellows 57 shown in FIG. 5 is securely mounted on its ends by way of fastening screws which are not shown on the wheel-side support member 17 and on the axle-side support member 19. Due to its cylindrical jacket, which is shaped like an accordion, the metal bellows 57 is elastically resilient in its axial direction so that angle displacements of the two pivoted parts 23, 25 can be equalized over the swivel angle φ for low reset forces.

The metal bellows 57 is spaced apart from the pivoted parts 23, 25 over a free radial distance and, as shown in FIG. 5, borders a mounting space 59 in which the two pivoted parts 23, are located, optionally hermetically sealed to the outside.

In a braking process the brake system 61 which is attached to the wheel-side support member 17 and which is indicated in FIG. 5 is activated. The resulting braking moment is not routed here by way of the two pivoted parts 23, 25 to the vehicle body, but by way of the metal bellows which enables play-free and torsionally stiff torque transmission of the braking moment to the vehicle body.

Figure 6:
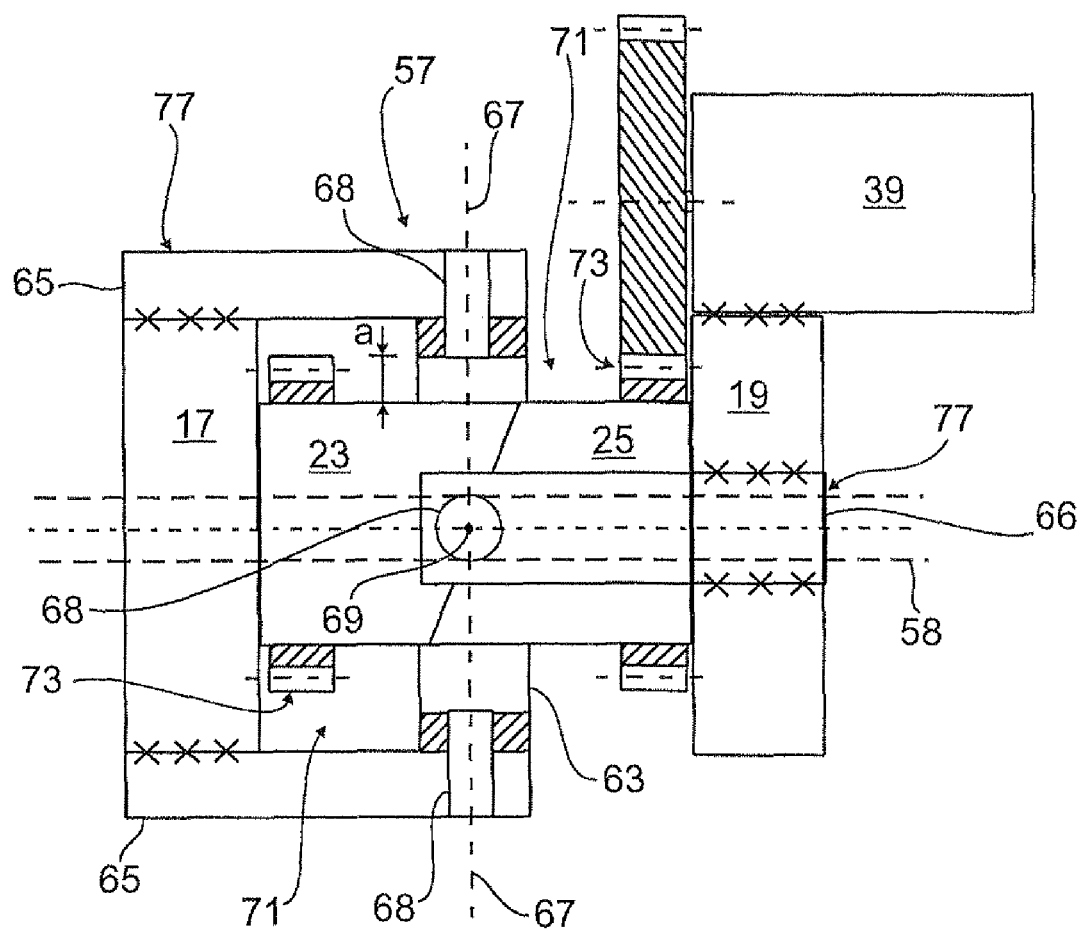
FIG. 6 shows the wheel carrier according to the fourth embodiment with an integrated universal joint.

FIG. 6 shows the fourth embodiment which in fundamental structure matches the preceding embodiments. Accordingly, reference is made to their description. In contrast to the preceding embodiments, the vehicle wheel 1 which is held on the wheel-side support member 17 (not shown in FIG. 6) is not trailed, i.e., is not driven by an articulated shaft, but there is additionally an articulated shaft 58 which is shown by the broken line in FIG. 6.

The articulated shaft 58 is routed through the cavities 35 of the two pivoted parts 23, 25 and drives the vehicle wheel 1, as is the case for rear wheel or all-wheel drive. For reasons of space therefore the two actuating drives 38, 39 (in FIG. 6 only actuating drive 39 is shown) are no longer located within the cavities 35, but outside the cavity 35 of the two pivoted parts 23, 25. The two actuating drives 38, 39 as shown in FIG. 7 are in a toothed connection by way of spur pinion stages 73 which are provided on the outer peripheral side on the pivoted parts 23, 25.

In contrast to the third embodiment of FIG. 5, the coupling element 57 for transmission of the braking moment from the wheel-side support member 17 to the axle side support member 19 is not a metal bellows, but a universal joint. The universal joint 57 as shown in FIG. 6 as a central articulated part has a gimbal 63 which is shown in a half section, which extends radially outside around the pivoted parts 23, 25 and which is spaced apart from the pivoted parts 23, 25 over a radial distance a. The gimbal 63 is each connected to the wheel-side support member 17 and the axle-side support member 19 by way of one respective universal joint fork 77 each.

The two articulated forks 77 each have wheel-side and axle-side bridges 65, 66. The bridges 65, 66 are on the one hand in a fixed connection to the support members 17, 19 and on the other hand by means of the bearing journals 68 which define the axes of rotation 67, 69 which are at a right angle to one another are coupled to the gimbal 63. The wheel-side and axle-side bridges 65, 66 are angularly offset to one another by an angle of 90° according to FIG. 6, with the formation of open spaces 71. In these open spaces 71 the gearing stage 73 and/or the respective torque motor 38, 39 can project at least in part.

The invention claimed is:

1. A steering device for a vehicle, with at least one actuator which pivots at least one steerable vehicle wheel by a steering angle which can be stipulated by way of a steering angle transducer, wherein the actuator has a wheel-side pivoted part and an axle-side pivoted part which can be turned around their axes of rotation to one another, and that to set the steering angle of the vehicle wheel the wheel-side pivoted part can be deflected when the two pivoted parts turn by the swivel angle (φ) relative to the axle-side pivoted part, and including a coupling member interconnecting the wheel-side and axle-side pivotal parts, functional to transmit a torque therebetween.

2. The steering device according to claim 1 wherein the axis of rotation of the wheel-side pivoted part is tilted by an angle of incline (γ) relative to the axis of rotation of the axle-side pivoted part.

3. The steering device according to claim 1 wherein the pivoted part moves with its middle axis in wobble motion with a variable swivel angle (φ) around the axis of rotation.

4. The steering device according to claim 1 wherein the two pivoted parts are in contact, preferably in sliding contact and/or rolling contact, by way of control surfaces which lie in one plane of rotation (I) which is perpendicular to the axis of rotation of the wheel-side pivoted part.

5. The steering device according to claim 1 wherein the two pivoted parts are pivoted by way of pivot bearings and/or antifriction bearings on the respective support members.

6. The steering device according to claim 1 wherein by turning the wheel-side pivoted part the swivel angle (φ) is set, and by turning of the axle-side pivoted part relative to the axle-side support member the three-dimensional alignment of the angle arrangement consisting of the two pivoted parts can be fixed.

7. The steering device according to claim 1 wherein the two pivoted parts are formed with cavities.

8. The steering device according to claim 1 wherein the actuator is integrated in a wheel carrier of the wheel suspension of the vehicle, which wheel carrier has, in particular, a wheel-side support member which pivots the vehicle wheel and an axle-side support member, between which the actuator is connected.

9. The steering device according to claim 1 wherein an actuating drive, in particular a torque motor which is located preferably inside and/or outside the respective pivoted part is assigned to at least each one of the two pivoted parts.

10. The steering device according claim 1 wherein the steering device has a control means which, based on the steering angle dictated by way of the steering angle transducer, triggers the actuator, in particular its actuating drive.

11. The steering device according to claim 10 wherein the control means in addition based on the track/camber angle setpoint ($\epsilon_{setpoint}$, $\delta_{setpoint}$) triggers the actuator, and, in particular, fixes the angles of rotation (α, β) over which the pivoted parts can be adjusted by means of the actuating drive.

12. The steering device according to claim 10 wherein the two pivoted parts are assigned angle transducers which detect the actual value of the angle of rotation ($\alpha_{actual}$, $\beta_{actual}$) of the pivoted parts and feed it back to the control means.

13. The steering device according to claim 1 the two pivoted parts are arranged interested into one another in the axial direction, in particular the axle-side pivoted part being located in a cavity of the wheel-side pivoted part.

14. The steering device according to claim 1 at least one of the two support members as a hollow profile part borders the mounting space (55) in which the two pivoted parts are at least partially located.

15. The steering device according to claim 1 wherein the coupling member is functionally decoupled from the actuator or the pivoted parts, and/or is spaced apart from the actuator over a clear distance (a).

16. The steering device according to claim 1 wherein the coupling member is torsionally stiff and allows deflection of the wheel-side pivoted part by the swivel angle (φ) relative to the axle-side pivoted part.

17. The steering device according to claim 1 the coupling member is a metal bellows which is mounted preferably on the wheel-side and on the axle-side support member.

18. The steering device according to claim 17 wherein the pivoted parts are located in a mounting space bordered by the metal bellows.

19. The steering device according to claim 1 wherein the coupling member is a universal joint.

20. The steering device according to claim 19 wherein the universal joint has a base element which is located preferably radially outside the pivoted parts, for example a ring element, and wheel-side and axle-side bridges which are connected to the support members and which are articulated to the base element by way of the axes of rotation.

21. The steering device according to claim 20 wherein the wheel-side bridges and axle-side bridges are angularly offset to one another with the formation of open spaces.

22. The steering device according to claim 9 wherein each of the pivoted parts on the outer peripheral side is provided with a gearing stage which leads to the respectively assigned actuating drive, in particular, by way of the open spaces.

23. The steering device according to claim 19 wherein the middle of the universal joint is at the height of the instantaneous pole of the wheel carrier.

24. The steering device according to claim 1 wherein the actuating drives are mounted on the respective support member.

25. The steering device according to one of claims claim 7 wherein an articulated shaft for driving one vehicle wheel is routed through the cavities of the pivoted parts.

26. A steering wheel assembly, comprising:
 means for supporting an axle;
 means for supporting a wheel;
 pivotal means mounted on said axle support means rotatable relative thereto about a first axis;
 pivotal means mounted on said wheel support means rotabable relative thereto about a second axis, swivable relative to said pivotal means mountable on said axle support means upon rotation of one of said mounted means relative to the other of said mounted means;
 means for rotating one of said mounted means relative to the other of said mounted means; and
 means for coupling said pivotal functional to transmit a torque therebetween.

27. A assembly according to claim 26 including a roller hearing disposed between mating surfaces of said pivotal means.

28. An assembly according to claim 26 including means for sensing the angular displacement of said pivotal means about their axes.

29. An assembly according to claim 26 including a bellows interconnecting said support means and encompassing said pivotal means.

30. An assembly according to claim 26 including a universal connection interconnecting said pivotal means.

31. A assembly according to claim 26 including an axle extending through an opening in said mounted means, connected to said wheel, provided with a universal connection.

* * * * *

UNITED STATES PATENT AND TRADEMARK OFFICE
CERTIFICATE OF CORRECTION

| | | |
|---|---|---|
| PATENT NO. | : 8,066,292 B2 | Page 1 of 1 |
| APPLICATION NO. | : 12/565251 | |
| DATED | : November 29, 2011 | |
| INVENTOR(S) | : Mueller et al. | |

It is certified that error appears in the above-identified patent and that said Letters Patent is hereby corrected as shown below:

Claim 7: Column 10, line 25: "The steering device according [to] claim 1..."
Please add "to" to the claim language.

Claim 8: Column 10, line 30: "...wheel-side support member which pivots the vehicle wheel [, ] and..."
Please add a "," in between "wheel" and "and.".

Claim 10: Column 10, line 37: "The steering device according [to] claim 1..." Please add "to" to the claim language.

Claim 13: Column 10, line 51: "...parts are arranged ~~interested~~ [internested] into one another..." Please delete the word "interested" and replace with the word "internested."

Claims 13, 14 and 17: Column 10, lines 52 and 56 - Column 11, line 1: All three of these claims are missing the term "wherein". The first line of each claim should read, "The steering device according to claim 1 [wherein]..." Please add "wherein" in the first line of each claim.

Claim 25: Column 11, line 28: "The steering device according to ~~one of claims~~ claim 7..." Please delete "one of claims.".

Claim 26: Column 12, Line 13: "...means for coupling said pivotal [means] functional..." Please add the word "means.".

Claims 27 and 31: Column 12, lines 15 and 26: Please change the first word in both claims to "An".

Signed and Sealed this
Tenth Day of July, 2012

David J. Kappos
*Director of the United States Patent and Trademark Office*